(12) United States Patent
Taketsugu

(10) Patent No.: US 6,621,826 B1
(45) Date of Patent: Sep. 16, 2003

(54) TRANSMISSION CONTROL METHOD

(75) Inventor: Masanori Taketsugu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/146,240

(22) Filed: Sep. 3, 1998

(30) Foreign Application Priority Data

Sep. 4, 1997 (JP) ............................................. 9-254120

(51) Int. Cl.[7] .................................................. H04J 3/16
(52) U.S. Cl. ...................................... 370/437; 370/445
(58) Field of Search ................................. 370/322, 348, 370/445, 447, 448, 449, 462, 463, 437, 450

(56) References Cited

U.S. PATENT DOCUMENTS

| | | | | |
|---|---|---|---|---|
| 4,409,592 A | * | 10/1983 | Hunt ........................ | 340/825.5 |
| 5,353,287 A | * | 10/1994 | Kuddes et al. ............... | 370/448 |
| 5,648,955 A | * | 7/1997 | Jensen et al. ................ | 370/252 |
| 5,717,889 A | * | 2/1998 | Rettig .......................... | 370/447 |
| 5,737,330 A | * | 4/1998 | Fulthorp et al. ............. | 370/346 |
| 5,740,167 A | * | 4/1998 | Taketsugu et al. ........... | 370/337 |
| 5,896,561 A | * | 4/1999 | Schrader et al. ............ | 455/67.1 |
| 5,940,399 A | * | 8/1999 | Weizman ..................... | 370/445 |
| 5,946,118 A | * | 8/1999 | Flaherty ...................... | 359/124 |

FOREIGN PATENT DOCUMENTS

JP          08-274788 A    * 10/1996   ............ H04L/12/28

* cited by examiner

Primary Examiner—Melvin Marcelo
Assistant Examiner—Jasper Kwoh
(74) Attorney, Agent, or Firm—Sughrue Mion, PLLC

(57) ABSTRACT

A transmission control method is provided which can improve a decrease in throughput when collision occurs during the use of a collision-based access system. In response to forward link message DA11(I,0) from a radio base station 10, a terminal 11 transmits a packet signal D11(0) while a terminal 12 transmits a packet signal D12(0). When the packet signals collide head-on, the radio base station 10 does not receive them but transmits forward link message D12(I,0). When the terminals 11 and 12 receive the forward link message, they judge that the packet signals transmitted by themselves have collided head-on and then transfers to a back-off state in which random time transmission is sustained. When forward link message DA13(I,0) is received from the radio base station 10, the terminal 12 restored from the back-off state retransmits the packet signal D12(0). Meanwhile, the terminal 11 is changed to a back-off state when receiving forward link message DA15(P,11) from the radio base station 10. The terminal 11 does not originally transmit a packet signal but retransmits the packet signal D11(0) because transmission request from the radio base station.

17 Claims, 4 Drawing Sheets

TRANSMISSION CONTROL METHOD

BACKGROUND OF THE INVENTION

The present invention relates to a transmission control method in a radio communication system. Particularly, the represent invention relates to a transmission control method in a communication system that establishes packet communications where a radio communication medium is shared between plural terminals and a base station and that uses a multiple access system in which possible collision occurs.

Conventionally, in packet communications, plural terminals often share the communication medium because of burst due to packet occurrence. In such a case, the shared communication medium provides a point-to-multipoint transmission line. If the communication medium is wireless, the forward link which transmits signals from a radio base station to terminals is used for broadcasting so that all terminals become a receivable state. The reverse link which transmits signals from a terminal to the radio station is generally used as a multi-access in which plural terminals use a common communication medium. To provide an effective multi-access mode to the reverse link means to increase the transmission capacity per shared communication medium. As a result, this allows the subscriber capacity of the system to be greatly increased.

To solve such a problem, various multi-access systems have been conventionally proposed. The basic system which can provide the simplest control is the ALOHA system (refer to Telecommunication Networks (ISBNO-201-16423), pp. 407–408). According to the basic concept of the system, packet signals are transmitted immediately when they are newly generated. This allows a very small delay to be achieved although collision may occur. This access system in which possible collision occurs is hereinafter called a collision-based access system.

Moreover, there is the CSMA (Carrier Sense Multiple Access) system (refer to Telecommunication Networks (ISBNO-201-16423), pp. 437) which detects whether or not other terminal currently is in a transmission mode by means of a receiving section and then transmits packet signals immediately when the idle period detection. This system allows collision of transmitted packets to be relieved because packet signals are not transmitted while other terminal is in a transmission mode.

However, when the case where a small number of terminals in mobile communications exits in a line-of-sight path and the effect of a hidden terminal is large, the terminal cannot completely sense the carrier. In such a case, the ICMA system (Idle-signal Casting Multiple Access) system is used to reduce collision of a packet signal at a multi-access time, thus improving the throughput.

Moreover, in consideration of survival at a packet signal collision time due to a capture effect, the ICMA-PE (Idle-signal Casting Multiple Access With Partial Echo) system that uses a portion of an up signal, or a partial echo, as an access control signal (Umeda and Onoe, "Idle-signal Casting Multiple Access With Partial Echo" Communication Technical Reports RCS91-30) has been proposed. FIG. 4 is a sequence diagram showing the ICMA-PE system.

Referring to FIG. 4, when the radio base station 40 receives an reverse link message Dlu(0) from the terminal 41, it sets up a busy flag as access control information and adds a portion of the received data Dlu(0) as a partial echo PE1(0). This operation can determine whether or not which terminal has transmitted a survival signal due to packet signal collision by a capture effect, thus enabling a relief process. Moreover, as a simple ICMA-PE system, a multiple access system called the ICMA-CD (Idle-signal Casting Multiple Access With Collision Detection) has been proposed.

However, in the collision-based access system, since collision cannot be avoided at the beginning of transmission, a serious problem occurs in the case where many terminals want transmission. Moreover, since the radio station cannot judge that a certain transmission error has occurred due to collision or degradation in the quality of a radio line, it is difficult to deal with such a problem.

There is an access system in which collision does not occur different from the above-mentioned collision-based access system. The multiple access system is hereinafter called the non-collision-based access system. This access system is generally realized by circulating the transmission right of a terminal. There is a multiple access system called polling system as one of non-collision-based access systems.

In the polling system, a radio base station asks each terminal whether there is a signal to be transmitted. If there is a signal to be transmitted to a terminal, the terminal transmits a signal so that polling (transmission invitation) is sequentially performed. In this polling system, since the radio station can perform centralized management, the signal collision at a multiple access time do not occur between plural terminals. However, even if a signal to be transmitted occurs at a terminal, the signal cannot be transmitted until polling invests it with a transmission right. Hence, there is the problem that the transmission delay occurs.

As one approach to solve such a problem, JP-A-274788/1996 discloses a multiple access method that uses adaptively and selectively the collision-based access system and the non-collision-based access system. That is, according to the communication traffic between a terminal and a radio base station, the connection delay is decreased by using the collision multiple access system at the time of low traffic and using the non-collision multiple access system at the time of high traffic. Moreover, high throughput can be realized even at a high traffic time.

According to the invention disclosed in JP-A-274788/1996, the collision-based access system employs such a methodology in which the terminal that judges that a packet signal transmitted from itself to avoid re-collision after the occurrence of collision has collided is transferred to a back-off state and then re-transmits the packet signal after a period of a random time or transmits the next signal. On the other hand, in the non-collision-based access system, since a terminal can perform transmission only by the polling from a radio base station, collision does not occur, so that the terminal does not change to a back-off state.

As described above, in the multiple access method adaptively using the collision-based access system and the non-collision-based access system, when the mode changes from the collision-based access system to the non-collision-based access system due to collision of a signal transmitted from a certain terminal, the terminal is changed to a back-off state. In this case, the problem arises that the terminal cannot perform transmission operation because of its back-off state even if polling is performed from the radio base station to the terminal.

SUMMARY OF THE INVENTION

The objective of the present invention is to solve the above-mentioned tasks.

Moreover, the objective of the invention is to provide a transmission control method that can improve a decrease in throughput due to a transmission disabled state when a terminal is changed to a back-off state due to collision happened during the use of a collision access system in a communication system using at least a collision-system multiple access system, thus becoming a transmission wait state.

In order to accomplish the above mentioned objects, the objective of the present invention is achieved by the transmission control method suitable in a radio communication system which performs packet communications by sharing a radio communication medium between plural terminals and a radio station and employs a multiple access system in which collision may occur, the method comprising the steps of switching, a terminal to a transmission mode, or if the terminal is in transmission mode keeping it in transmission mode, during use of a collision-based access system when receiving a polling from said radio base station, said terminal being changed to a back-off state, thus being in a wait state, because of collision of a signal transmitted from said terminal.

In the transmission control method according to the present invention, each of the terminals judges that a packet signal transmitted from its terminal has collided when its terminal receives access control information from the radio base station after transmitting the, packet signal to the radio base station, the access control information representing no reception, and changes to a back-off state in which a different random time transmission is suspended.

In the transmission control method according to the present invention, the radio base station transmits a common polling signal to all the terminals when a packet signal from each of the terminals is not received, and sequentially transmits polling signals to other terminals after a packet is completely received from a specific terminal.

Furthermore, in the transmission control method suitable in a radio communication system which performs packet communications by sharing a radio communication medium between plural terminals and a radio station and adaptively employs a multiple access system in which collision may occur and a multiple access system in which collision does not occur, the method comprises the steps of detecting collision by means of the radio station; changing the radio communication system to a back-off state by transmitting the collision signal when the multiple access system in which collision may occur is changed to the multiple access system in which collision does not occur; and making the terminal in a transmission mode at a polling receive time when the terminal in a wait state has received polling from the base station.

In the transmission control method according to the present invention, each of the terminals judges that a packet signal transmitted from itself has collided when receiving the access control information from the radio base station, the access control information representing that the packet signal is not received, after transmission of the packet signal to the radio station, and changes to a back-off state in which a different random time transmission is sustained.

Moreover, in the transmission control method suitable in a radio communication system which performs packet communications by sharing a radio communication medium between plural terminals and a radio base station and employs a multiple access system in which collision may occur in a reverse link from the plural terminals to the radio base station and which realizes transmission confirmation regarding a forward link packet signal to be transmitted on a forward link in response to a response signal from a terminal being a destination of the forward link packet signal, the method comprises the steps of transmitting a collision signal after the radio base station detects collision; and transmitting a response signal for transmission confirmation at a polling receiving time when a terminal changed to a back-off state and in a wait state receives polling from the radio station.

According to the present invention, when the radio communication system is changed from the collision-based access system to the non-collision-based access system or a response signal is sent back to a signal transmitted on the forward link, a terminal in a back-off state or wait state can be quickly changed to a transmission mode in response to a polling signal from a radio base station. As a result, the throughput is improved and the radio line can be effectively used. Moreover, a response signal to be transmitted from a terminal for transmission confirmation can be quickly invited to a signal to be transmitted from a base station to a terminal.

According to the present invention, the transmission control method comprises the steps of transmitting a first forward link message from a radio base station to terminals; transmitting packet signals from the terminals in response to the first forward link message; transmitting a second forward link message from the radio base station when the radio base station does not receive the packet signals due to collision of the packet signals; changing the terminals to a back-off state in response to the second forward link message to avoid re-collision; retransmitting a packet signal from a terminal first recovered from the back-off state in response to a third forward link message from the radio base station; transmitting a fourth forward link message containing access control information from the radio base station first recovered terminal when the radio base station correctly receives the packet signal from the first recovered terminal; and sequentially transmitting a fifth forward link message from the radio base station when a packet signal from the first recovered terminal is transmitted.

Moreover, according to the present invention, the transmission control method comprises the steps of transmitting a first forward link message from a radio base station to terminals; transmitting packet signals from the terminals in response to the first forward link message when the radio base station is in a collision-system access mode; changing the radio base station from a collision-system access mode to a non-collision-system access mode when the radio base station does not receive the packet signals due to collision of the packet signals, and then transmitting a second forward link message from the radio base station; changing the terminals to a back-off state in response to the second forward link message to avoid re-collision; retransmitting a packet signal from a terminal first recovered from the back-off state according to transmission invitation in response to a third forward link message from the radio base station; transmitting a fourth forward link message containing polling information from the radio base station to the first recovered terminal when the radio base station correctly receives the packet signal from the first recovered terminal; and sequentially transmitting a fifth forward link message from the radio base station when a packet signal from the first recovered terminal is transmitted.

According to the present invention, the transmission control method comprises the steps of transmitting packet signals from terminals in response to a first forward link message from a radio base station; transmitting a second forward link message from the radio base station when the radio base station does not receive the packet signals due to collision of the packet signals; changing the terminals to a back-off state in response to the second forward link message to avoid re-collision; extracting forward link message for a terminal in a back-off state from a third forward link message transmitted from the radio base station retransmitting a packet signal from a terminal first recovered from the back-off state in response to the third forward link message from the radio base station; transmitting a fourth forward link message containing access control information and forward link message for first-recovered terminal from the radio base station when the radio base station correctly receives the packet signal from the first recovered terminal; extracting forward link message from the fourth forward link message; transmitting a fifth forward link message containing access control information and forward link message from the radio base station to confirm transmission of forward link message; and transmitting a response packet signal from the terminal in a back-off state in response to the fifth forward link message.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Figure 1:
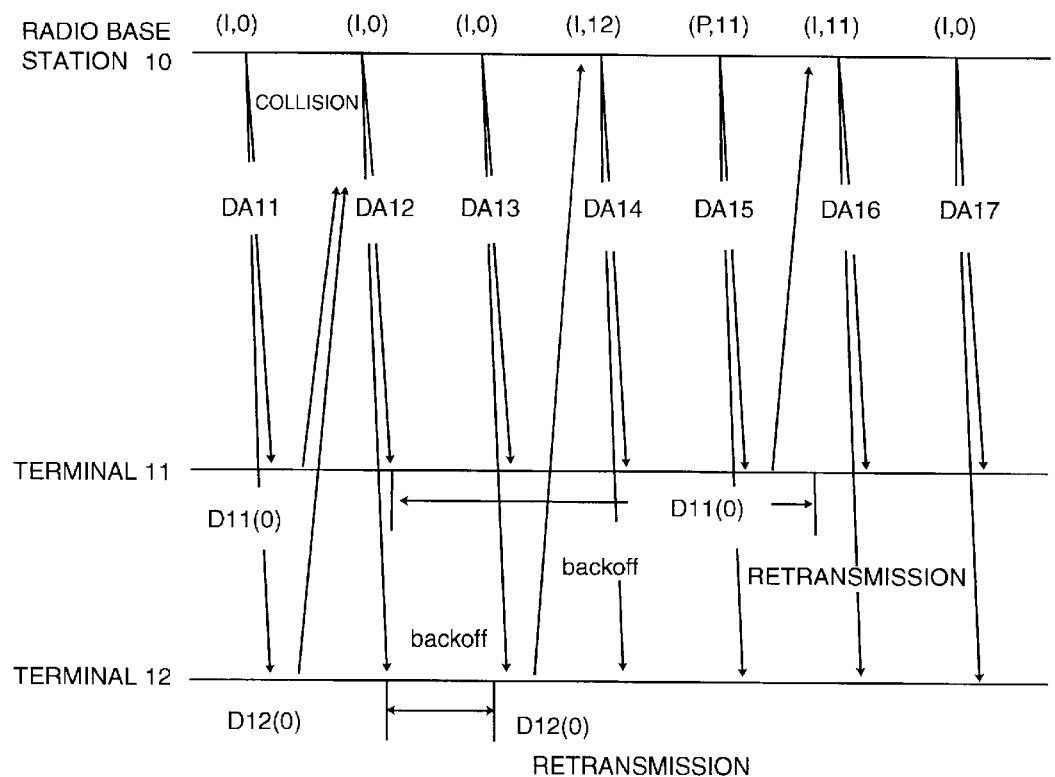
FIG. 1 is a diagram illustrating a communication sequence between a base station and a terminal according to a first embodiment of the present invention.

FIG. 1 is a sequence diagram illustrating communications between a base terminal and terminals according to an embodiment of the present invention. The embodiment relates to a radio packet communication system in which the reverse link message has a time slot structure and the forward link message has a time slot structure. The ICMA-PE system is employed for the reverse link multiple access. The radio base station 10 communicates with the terminals 11 and 12. Numeral 11 represents the identifier of the terminal 11 while 12 represents the identifier of the terminal 12.

Referring to FIG. 1, the radio base station 10 transmits down signals (DA11 to DA17) containing access control information formed of a Busy/Idle/Polling flag and a polling address to each of terminals. The terminal 11 transmits the packet signal D11(0) in response to the forward link message DA11 containing Idle information from the radio base station 10 while the terminal 12 transmits the packet signal D12(0) in response to the forward link message DA11 containing Idle information from the radio base station 10.

When the packet signals D11(0) and D12(0) collide and the radio base station 10 cannot receive them, the radio base station 10 transmits the forward link message DA12 containing access control information formed of an Idle flag and a polling address "0". In response to the forward link message DA12, each of the terminals 11 and 12 judges that collision of the packet signal transmitted by itself has occurred and then changes to a back-off state in which random time transmission is held, to avoid re-collision.

When first recovering from the back-off state and receiving the forward link message DA13 containing Idle information from the radio base station 10, the terminal 12 re-transmits the packet signal D12(0). When correctly receiving the packet signal, the radio base station 10 transmits the forward link message DA14 containing access control information formed of an Idle flag and a polling address "12" as the identifier of the terminal 12. In response to the forward link message DA14, the terminal 12 judges that the packet signal transmitted by itself has been correctly received by the radio base station 10.

When the terminal 12 does not sequentially transmit following packet signals, the radio base station 10 transmits the forward link message DA15 containing access control information formed of a Polling flag and a polling address "11" as the identifier 11 of the terminal 11 and then invites the terminal 11 to send packet signals. The terminal 11 which has received the forward link message DA15 is in a back-off state and does not originally transmit packet signals. However, according to the invitation from the radio base station, the terminal 11 in a back-off state re-transmits the packet signal D11(0). When correctly receiving the packet signal, the radio base station 10 transmits the forward link message DA15 containing access control information formed of an Idle flag and a polling access "11" as the identifier 11 of the terminal 11. In response to the forward link message DA15, the terminal 11 judges that the radio base station 10 has correctly received the packet signal transmitted by itself.

As described above, when receiving a polling signal from the radio base station, even the terminal in a back-off state can transmits the packet signal, so that packet signals can be effectively transmitted.

Figure 2:
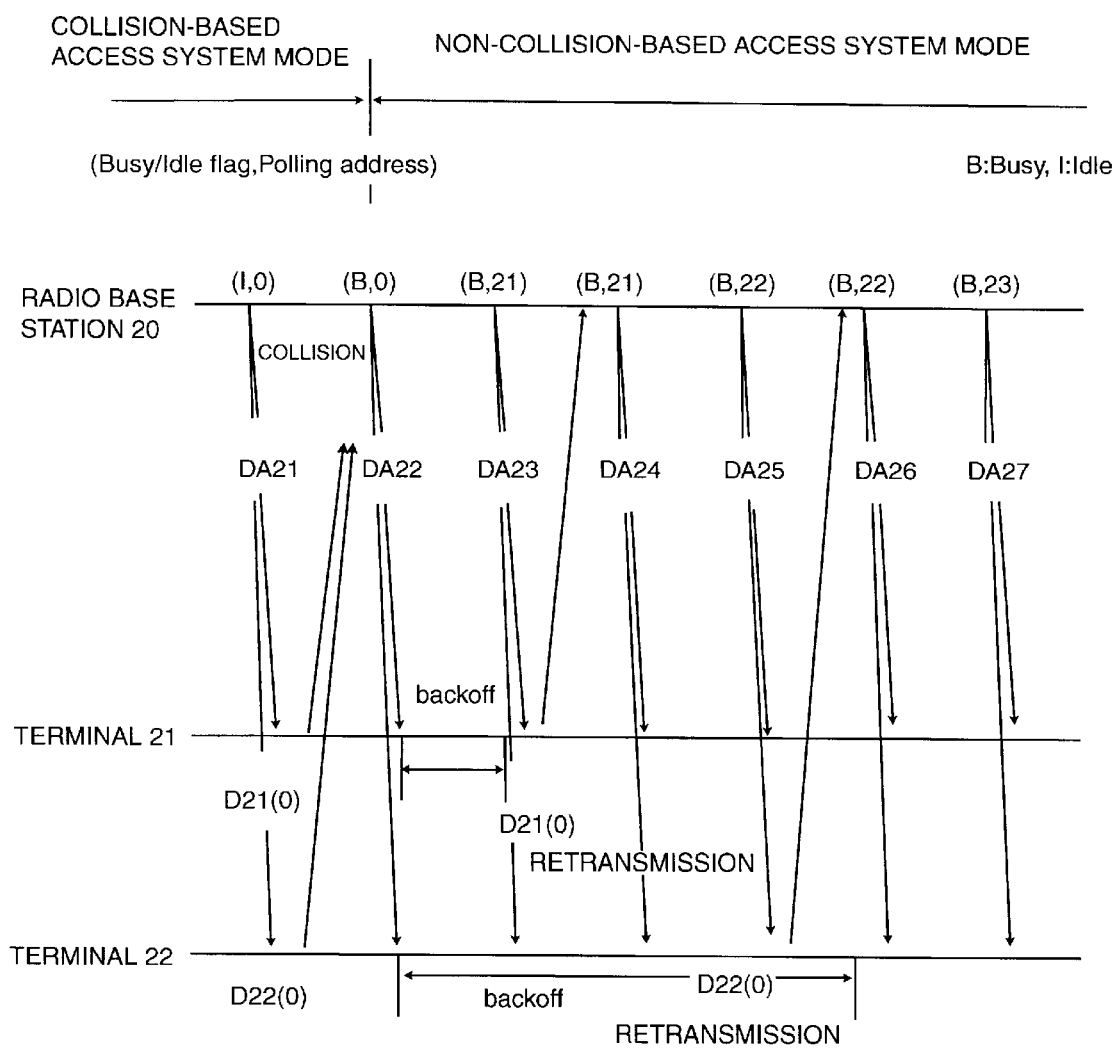
FIG. 2 is a diagram illustrating a communication sequence between a base station and a terminal according to a second embodiment of the present invention.

FIG. 2 is a sequence diagram illustrating communication sequences between a radio base station and a terminal according to the second embodiment of the present invention. This embodiment relates a radio packet communication system in which each of the reverse link message and the forward link message has a time slot structure. The reverse link multiple access employs the ICMA-CD system. In order to improve the transmission efficiency, the radio base station 20 communicates with the terminals 21 and 22 by adaptively using the collision-based access system and the non-collision-based access system. Numeral 21 represents the identifier of the terminal, 21 while 22 represents the identifier of the terminal 22.

Referring to FIG. 2, the radio base station 20 transmits the down signals (DA21 to DA27) containing access control information formed of a Busy/Idle flag and a polling address to the terminals. When the radio base station 20 is in the collision access mode, the terminal 21 transmits the packet signal D21(0) in response to DA21 containing Idle information from the radio base station 20 while the terminal 22 transmits the packet signal D22(0) in response to DA21 containing Idle information from the radio base station 20.

In the case where the packet signals collide and are not received by the radio base station 20, the radio base station 20 judges that collision has occurred and changes from the collision-system access mode to the non-collision-system access mode to avoid re-collision, thus transmitting the forward link message DA22 containing access control information containing a Busy flag and a polling address "0". In response to the forward link message DA22, the terminal 21 judges that the packet signal transmitted by itself has collided and turns to a back-off state in which random time transmission is held to avoid re-collision while the terminal 22 judges that the packet signal transmitted by itself has collided and turns to a back-off state in which random time transmission is held to avoid re-collision.

When the terminal 21 first recovers from the back-off state, it receives the forward link message DA23 containing polling information for itself formed of a Busy flag and a polling address. Then, the terminal 21 retransmits the packet signal D21(0) (being the collided packet signal) according to invitation from the radio base station 20. When correctly receiving the packet signal, the radio base station 20 again transmits the forward link message DA24 containing the polling information for the terminal 21. However, since the terminal 21 does not transmit a packet signal, the radio base station sequentially transmits forward link message DA25 containing polling information formed of a Busy flag and a polling address "22" as the identifier 22 of the terminal 22.

When the terminal 22, which receives the forward link message DA25, it is in a back-off state and does not originally send the packet signal. However, since there is invitation from the radio base station, the terminal 22 in a back-off state re-transmits the D21(0) being the collided packet signal. When the radio base station 20 correctly receives the packet signal, it retransmits the forward link message DA26 containing the polling information for the terminal 22. However, since packet signals are not sequentially transmitted from the terminal 22, the radio base station 20 sequentially transmits the forward link message DA27 containing polling information for the next terminal to be invited for transmission.

As described above, in the radio system where the collision-system access mode and the non-collision-system access mode are selectively used to improve the transmission efficiency, even the terminal in a back-off state can effectively transmits packet signals in response to the polling signal from the radio base station.

Figure 3:
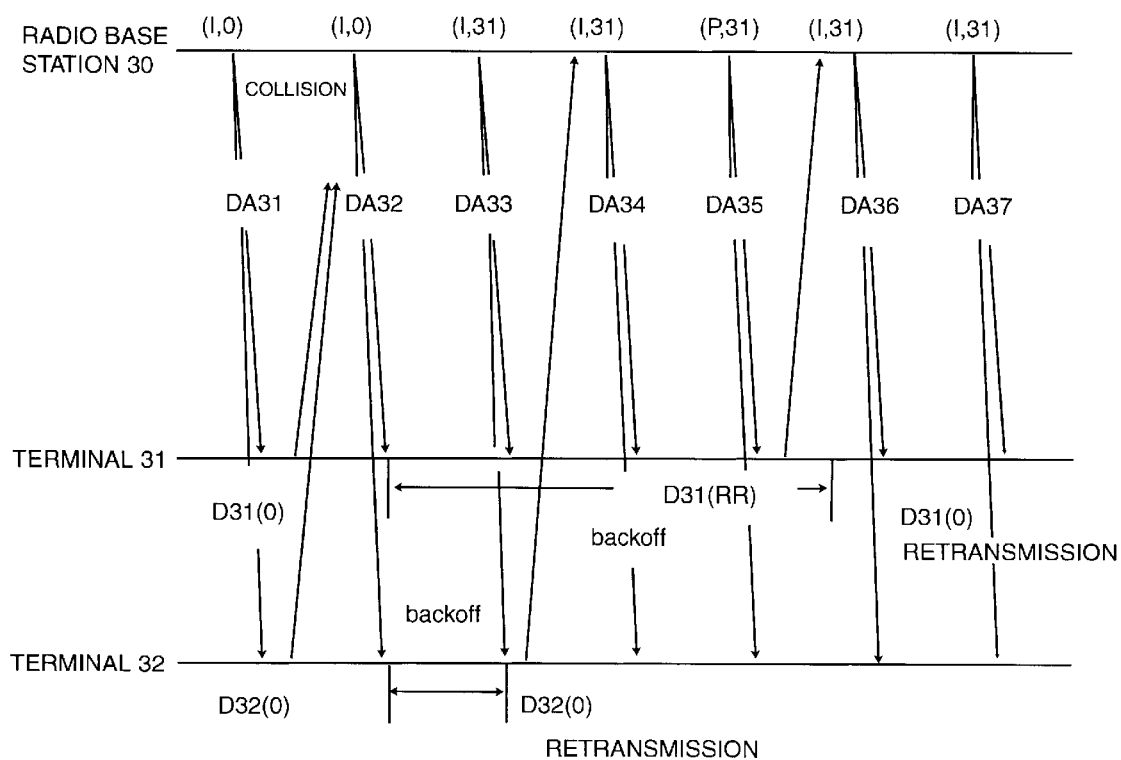
FIG. 3 is a diagram illustrating a communication sequence between a base station and a terminal according to a third embodiment of the present invention.
Figure 4:
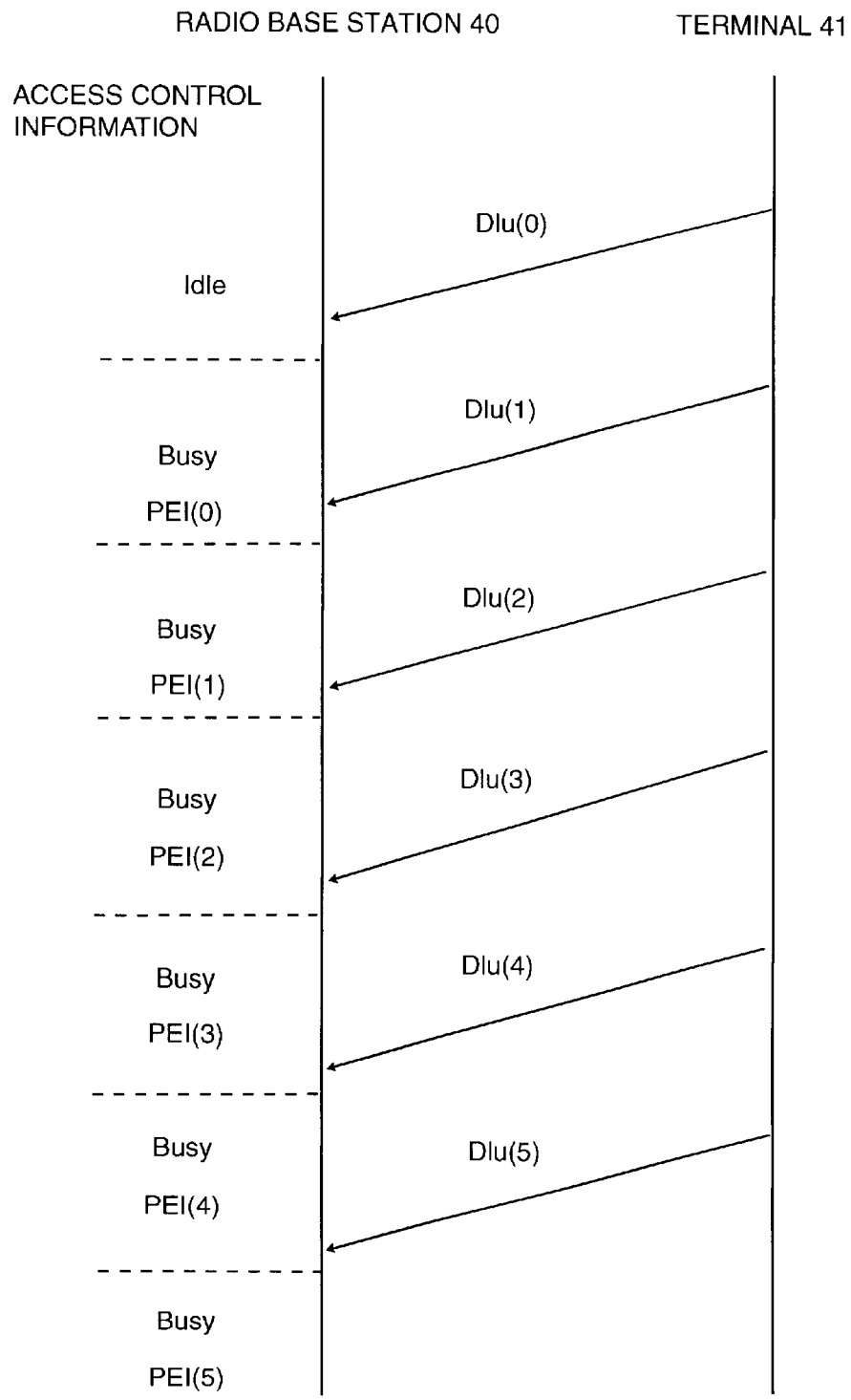
FIG. 4 is an explanatory diagram illustrating the ICMA-CD system.

FIG. 3 is a sequence chart illustrating a communication sequence between a radio base station and a terminal according to the third embodiment of the present invention. This embodiment relates to a radio packet communication system in which each of the reverse link message and the forward link message has a time slot structure. The reverse link multiple access employs the ICMA-CD system. The down packet signal transmitted from the radio base station 30 to the terminals 31 and 32 is confirmed using a protocol corresponding to LAPB (Balanced Link Access Procedure). Numeral 31 represents the identifier of the terminal 31 while 32 represents the identifier of the terminal 32.

Referring to FIG. 3, the radio base station 30 sequentially transmits down signals (DA31 to DA37) formed of a Busy/Idle/Polling flag and a destination address to each terminal. The terminal 31 transmits the packet signal D31(0) in response to the forward link message DA31 containing Idle information from the radio base station 30. The terminal 32 transmits the packet signal D32(0) in response to the forward link message DA31 containing Idle information from the radio base station 30.

Since the packet signals D31(0) and D32(0) collide, the radio base station 30 cannot receive them. Hence, the radio base station 30 transmits the forward link message DA32 containing access control information in which destination address is 0. In response to the forward link message DA32, the terminal 31 judges that collision of the packet signal transmitted by it has occurred, and then switches to a back-off state in which a random time transmission is held to avoid repeated collision.

The radio base station 30 transmits forward link message for the terminal 31 and further transmits the forward link message DA33 formed of access control information containing an Idle flag and a destination address "31" as the identifier of the terminal 31 as well as the forward link message for the terminal 31. When the terminal 31 receives the forward link message DA33, it takes out the forward link message for itself.

The terminal 32 which has first recovered from the back-off state receives the forward link message DA33 containing Idle information from the radio base station 30, it re-transmits the packet signal D32(0) being the collided packet signal. To transmit the forward link message for the successive terminal 31, the radio base station 30, which has correctly received the packet signal, transmits the forward link message DA34 formed of access control information containing an Idle flag and a destination address "31" as the identifier of the terminal 31 as well as the down-steam data for the terminal 31. The terminal 31 receives the forward link message DA34 and then extracts the forward link message for itself from it.

Next, the radio base station 30 confirms that the forward link message for the successive terminal 31 as well as the forward link message transmitted until now have been transmitted and then transmits the forward link message DA35 formed of access control information and forward link message for the terminal 31. The access control information includes a Busy/Idle/polling flag as polling (transmission confirmation request) and a destination address "31" as the identifier of the terminal 31. When receiving the forward link message DA35, the terminal 31 extracts the forward link message for itself from it. Moreover, regardless of the back-off state, the terminal 31 transmits a packet signal D31(RR) to send an acknowledgment to an inquiry of confirmation from the radio base station 30.

When the radio base station 30 correctly receives the packet signal for the response, it transmits the forward link message DA36 formed of access control information and the forward link message for the successive terminal 31. The access control information includes an Idle flag and a destination address "31" as the identifier of the terminal 31. The terminal 31 receives the forward link message DA36 and then extracts the forward link message for itself from it. Since the terminal 31 is relieved from the back-off state until this time, it re-transmits the packet signal D31(0) being the collided packet signal, in response the forward link message DA36 containing the Idle information.

As described above, even a terminal in a back-off state can quickly confirm transmission of forward link message when the polling signal from the radio base station is received, so that packets can be effectively transmitted.

In the radio communication system according to the present invention, the radio base station transmits a polling signal to a terminal which is in a back-off state due to an occurrence of collision and holds its spontaneous transmission, and then urges the terminal to transmit signals without delaying based on a request thereof. Hence, effectively packet transmission can be realized.

In the present system employed to the system which adaptively uses the collision-system access mode and the non-collision-system access mode to improve the transmission efficiency, a terminal can transmit packet signals when a polling signal from the radio communication station is received in transmission invitation sent immediately when the mode has changed from the collision-system access mode to the non-collision-system access mode. As a result, more effective packet transmission can be realized.

In the present system employed to the radio system which performs transmission confirmation corresponding to LAPB to the forward link message transmitted from a radio base station to a terminal, even the terminal changed to a back-off state and receiving the forward link message for itself can quickly transmit the response signal in response to the forward link packet signal when receiving a polling signal from the radio base station. As a result, effective packet transmission can be realized.

The entire disclosure of Japanese Patent Application No. 9-254120 filed on Sep. 4, 1997 including specification, claims, drawing and summary are incorporated herein by reference in its entirety.

What is claimed is:

1. A transmission control method suitable in a radio communication system which performs packet communications by sharing a radio communication medium between plural terminals and a radio base station and employs a multiple access system in which collision may occur, said method comprising:

detecting a collision of a first signal transmitted from a terminal;

changing said terminal to a back-off state upon said detecting of said collision; and getting said terminal into a transmission mode during use of a collision-based access system upon receiving a polling from said radio base station, said terminal having been changed to said back-off state, thus being in a wait state.

2. The transmission control method defined in claim 1, wherein each of said terminals judges that said first signal transmitted from its terminal has collided when said terminal receives access control information from said radio base station, said access control information representing no reception, and changes to the back-off state in which for a random time transmission is suspended.

3. The transmission control method defined in claim 1, wherein in response to said collision of a first signal, said radio base station transmits a common polling signal to all said terminals when a second signal from each of said terminals is not received, and sequentially transmits polling signals to remaining terminals after said second signal is received from at least one terminal of said terminals.

4. A transmission control method suitable in a radio communication system which performs packet communications by sharing a radio communication medium between plural terminals and a radio station and adaptively employs a multiple access system in which collision may occur and a multiple access system in which collision does not occur, said method comprising:

detecting collision by means of said radio station;

changing said radio communication system to a back-off state by transmitting access control information when said multiple access system in which collision may occur is changed to said multiple access system in which collision does not occur; and getting a terminal into a transmission mode at a polling receive time when said terminal in said back-off state has received polling from said radio station.

5. The transmission control method defined in claim 4, wherein each of said terminals judges that a first-packet signal transmitted from itself has collided when receiving access control information from said radio station, said access control information representing that said packet signal is not received, after transmission of said first packet signal to said radio station, and changes to a back-off state in which for a random time transmission is suspended.

6. A transmission control method suitable in a radio communication system which performs packet communications by sharing a radio communication medium between plural terminals and a radio station and employs a multiple access system in which collision may occur in a reverse link from said plural terminals to said radio base station and which realizes transmission confirmation via a forward link packet signal in response to a signal from a terminal being a destination of said forward link packet signal, said method comprising:

transmitting a collision signal after said radio base station detects collision of a first packet signal; and transmitting a response signal for transmission confirmation at a polling receiving time when a terminal changed to a back-off state and in a wait state receives polling from said radio station.

7. The transmission control method defined in claim 6, wherein each of said terminals judges that said first packet signal transmitted from itself has collided when receiving access control information from said radio-base station, said access control information representing that said packet signal is not received, and changes to a back-off state in which for a random time transmission is suspended.

8. A transmission control method comprising:

transmitting a first forward link message from a radio base station to terminals;

transmitting packet signals from said terminals in response to said first forward link message;

transmitting a second forward link message from said radio base station when said radio base station does not receive said packet signals due to collision of said packet signals;

changing said terminals to a back-off state in response to said second forward link message to avoid re-collision;

re-transmitting a packet signal from a terminal first recovered from said back-off state in response to a third forward link message from containing access control information from said radio base station when said radio base station correctly receives said packet signal from said first recovered terminal; and judging that said packet signal from said first recovered terminal has been correctly received by said radio base station when said first recovered terminal receives said fourth forward link message.

9. A transmission control method comprising:

transmitting a first forward link message from a radio base station to terminals;

transmitting packet signals from said terminals in response to said first forward link message when said radio base station is in a collision-system access mode;

changing said radio base station from said collision-system access mode to a non-collision-system access mode when said radio base station does not receive said packet signals due to collision of said packet signals, and then transmitting a second forward link message from said radio base station;

changing said terminals to a back-off state in response to said second forward link message to avoid re-collision;

retransmitting said packet signal from a terminal first recovered from said back-off state according to transmission invitation in response to a third forward link message from said radio base station;

transmitting a fourth forward link message containing polling information from said radio base station to said first recovered terminal when said radio base station receives said retransmitted packet signal from said first recovered terminal; and sequentially transmitting a fifth forward link message from said radio base station after said retransmitted packet signal from said first recovered terminal is transmitted.

10. A transmission control method comprising:

transmitting packet signals from terminals in response to a first forward link message from a radio base station;

transmitting a second forward link message from said radio base station when said radio base station does not receive said packet signals due to collision of said packet signals;

changing said terminals to a back-off state in response to said second forward link message to avoid re-collision;

extracting a third message for a terminal in a back-off state from a third forward link message transmitted from said radio base station;

re-transmitting said packet signal from a first recovered terminal, said first recovered terminal being the terminal first recovered from said back-off state in response to said third forward link message from said radio base station;

transmitting a fourth forward link message containing access control information and a fourth message for said first recovered terminal from said radio base station when said radio base station correctly receives said packet signal from said first recovered terminal;

extracting said fourth message from said fourth forward link message;

transmitting a fifth forward link message containing access control information and a fifth message from said radio base station to confirm transmission of forward link message; and transmitting a response packet signal from said first recovered terminal in response to said fifth forward link message.

11. A transmission control method comprising:

detecting a signal collision resulting from a radio signal transmitted by a terminal of from a plurality of wireless terminals, said plurality of wireless terminals sending and receiving electromagnetic signals to a base station; and switching to a back-off state at least one terminal of said plurality of terminals in response to said signal collision getting said at least one terminal into a transmission mode during use of a collision-based access system upon receiving a polling from said base station.

12. A transmission control system comprising:

a base station and a plurality of wireless terminals configured to receive and transmit using a multiple access wireless communication system, wherein said transmission control system detects a signal collision resulting from a wireless signal transmitted by a terminal of said plurality of wireless terminals, switches at least one terminal of said plurality of wireless terminals to a back-off state in response to said signal collision, and, upon receiving a polling from said base station, switches from a back-off state to a transmission mode said at least one terminal of said plurality of wireless terminals.

13. The transmission control system according to claim 12, further comprising a multiple access wireless communication system using radio frequency data packet communication wherein said at least one terminal of said plurality of wireless terminals judges that said signal collision has occurred in response to said signal collision and then said at least one terminal of said plurality of wireless terminals switches itself to a back-off state.

14. A transmission control method comprising:

using a multiple access wireless communication system for communicating between a base station and a plurality of wireless terminals;

detecting a signal collision because of a wireless signal transmitted by a terminal from said plurality of wireless terminals;

switching at least one terminal of said plurality of wireless terminals to a back-off state in response to said signal collision; and switching, upon receiving a polling from said base station, from a back-off state to a transmission mode said at least one terminal of said plurality of wireless terminals.

15. The transmission control method of claim 14, wherein said multiple access wireless communication system uses radio frequency data packet communication and said at least one terminal of said plurality of wireless terminals judges that said signal collision has occurred in response to said signal collision and then said at least one terminal of said plurality of wireless terminals switches itself to a back-off state.

16. A transmission control system comprising:

multiple access wireless communication means for using a base station and a plurality of wireless terminals;

signal collision detecting means for detecting signal collision resulting from a wireless signal transmitted by a terminal of said plurality of wireless terminals; and switching means for switching at least one terminal from said plurality of wireless terminals to a back-off state in response to said signal collision, and for switching, upon receiving a polling from said base station, from a back-off state to a transmission mode said at least one terminal of said plurality of wireless terminals.

17. The transmission control system of claim 16, wherein said multiple access wireless communication means uses radio frequency data packet communication and said at least one terminal of said plurality of wireless terminals judges that said signal collision has occurred in response to said signal collision and said switching means are coupled to said at least one terminal of said plurality of wireless terminals.

* * * * *